PUSH-PULL AMPLIFIER STAGE HAVING A.C. POWER SUPPLY AND BIAS

Filed May 25, 1964

United States Patent Office 3,366,858 Patented Jan. 30, 1968

3,366,858

PUSH-PULL AMPLIFIER STAGE HAVING A.C. POWER SUPPLY AND BIAS

Thomas J. Walsh, Hatboro, Pa., assignor to Leeds & Northrup Company, a corporation of Pennsylvania Filed May 25, 1964, Ser. No. 369,972
5 Claims. (Cl. 318—18)

ABSTRACT OF THE DISCLOSURE

A push-pull power output stage including two transistors connected in the single-ended push-pull configuration and powered by a center tapped transformer connected to the A.C. supply line. An A.C. bias is applied to the transistors to render them slightly conducting on alternate half-cycles to facilitate turn-on of the transistors in response to the input signal. This reduces the deadband of the measuring system in which the transistors are connected.

Figure 1:
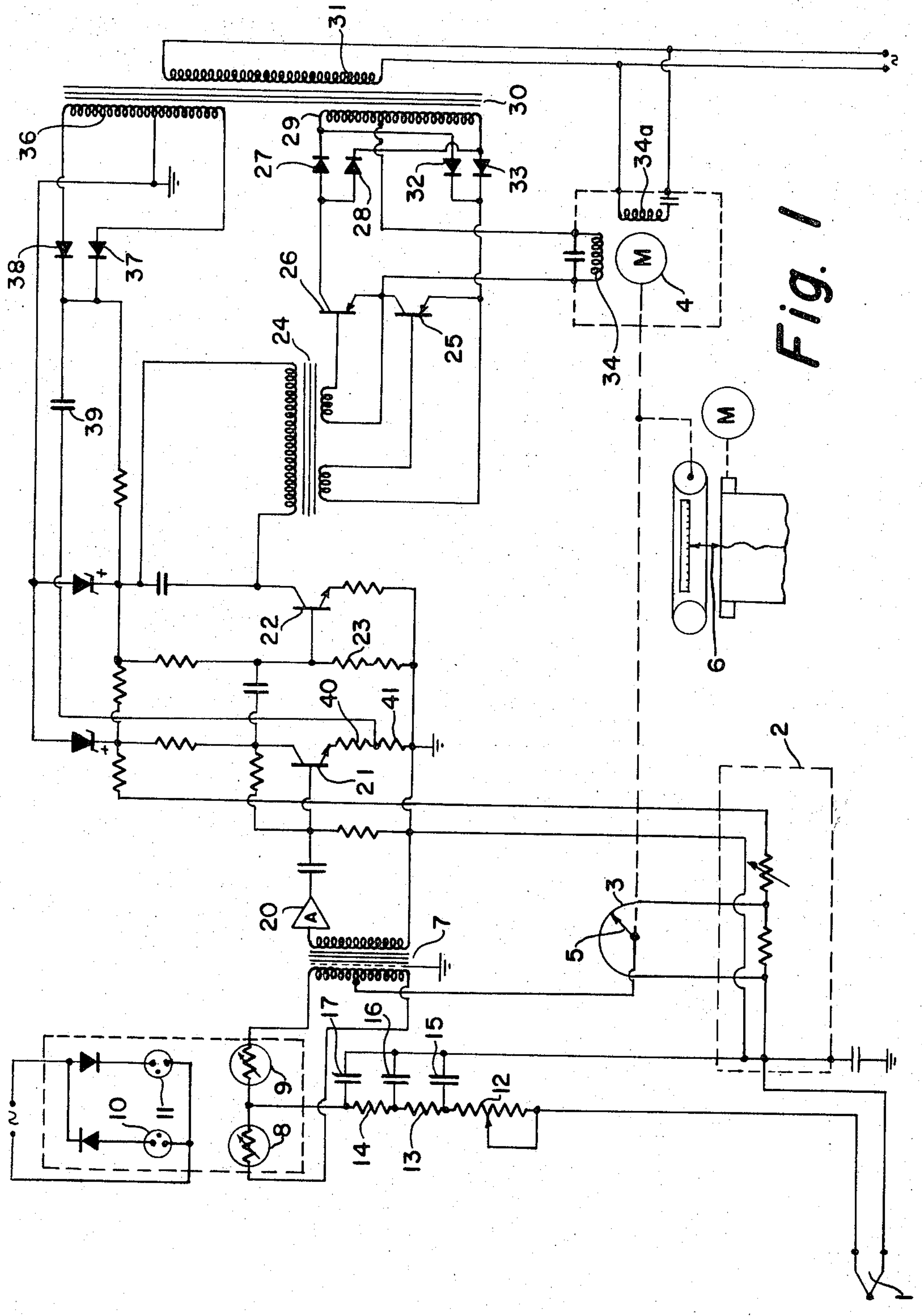

This invention relates to amplifiers and, more particularly, a method of and means for applying an A.C. bias to a single-ended push-pull transistor amplifier.

Transistor amplifiers of the push-pull type are commonly used to drive the positioning device in servo systems. As an example, consider a measuring system in which it is desired to record a D.C. voltage which may be the output of a sensing device. The output of this device is connected to a balancing slidewire, or potentiometer, which forms part of a null balance, or self-balancing, potentiometric circuit. The positioning device drives the movable contact of the potentiometer to a position which reduces to zero the unbalance or error voltage between the output of the sensing device and the output of the potentiometer. The error voltage is sensed and converted to a signal which can be applied to a transistor amplifier which drives the positioning device.

Although the amplifier of this invention can be used in many applications, it is particularly suitable for use in the measuring system described above. In such a system, one of the stringent requirements of the amplifier is that it reacts quickly to variations in the error voltage. This requirement is necessary to insure that the positioning device accurately follows deviations in the output of the sensing device without hunting. A system which reacts quickly to changes in the output of the sensing device is sometimes referred to as a system with a small deadband.

One technique for decreasing the deadband of the system is to provide biasing for the transistors in the amplifier so that the transistors conduct even though a very low input signal is applied to them. These transistors require a certain voltage between the base and emitter before they are conductive. Therefore, the input signal must rise above a predetermined level before the transistor begins conduction to drive the positioning device. This lag, which occurs before the input signal rises to the required level, introduces deadband into the system. The deadband can be reduced by biasing the transistors so that they will conduct for even minimum input signals.

One prior art technique for reducing this amplifier deadband involves providing a D.C. bias for the transistors. This technique is not always satisfactory. For one reason, if the transistors are always biased to conduction, there will always be current dissipation in the transistors and this dissipation can become a problem if it is continued for a long time. In addition, the components required to provide a D.C. bias are more numerous and hence the bias circuitry is more costly.

In accordance with one aspect of this invention, there is provided an A.C. biasing circuit which applies an A.C. signal between the base and emitter of each transistor so that the transistor is biased toward conduction only during each half cycle through which the transistor may conduct.

More particularly, there is provided a power output stage which includes two transistors connected in a single-ended push-pull configuration and powered by a center-tapped secondary winding on a transformer, the primary of which is connected to the A.C. supply line or primary source. In the single-ended push-pull connection, the emitter of the first transistor is connected to a junction point which is also connected to the collector of the second transistor. The collector of the first transistor is connected by way of two diodes to the end terminals of a center-tapped A.C. supply. The emitter of the second transistor is also connected by way of two diodes to the same two terminals of the center-tapped A.C. supply. The positioning device, or any suitable load device, is connected between the junction point and the center tap of the transformer.

The A.C. biasing signal is conveniently derived from the transformer. A biasing signal of twice the repetition rate of the primary A.C. source is derived from a secondary winding by means of two diodes connected as a full wave rectifier across the secondary winding. This double frequency biasing signal is applied to a coupling transformer which also couples the input signal to the transistors. When there is no input signal, indicating that the potentiometer is balanced with the sensing device, the double frequency biasing signal is applied between the base and emitter of each of the transistors alternately biasing the transistors to conduction at a frequency which is twice the repetition rate of the A.C. source. As a result of the alternate conduction of both transistors, current of twice the repetition rate of the primary source flows through the control winding of the positioning device. The primary source is applied to a reference winding of the positioning device and hence the positioning device will respond only to a signal of the same frequency as the primary source applied to the control winding. Therefore, the current of twice the repetition rate of the primary source has no effect on the motor.

However, when there is an input signal indicating that an unbalanced condition exists, the transistors will conduct to induce a current through the control winding at the same frequency as the primary source. The motor will respond to this current. Furthermore, this input signal will be quickly sensed by the transistors because the A.C. biasing signal has maintained each transistor conducting slightly. In this manner, the deadband of the system has been reduced considerably.

Figure 3B:
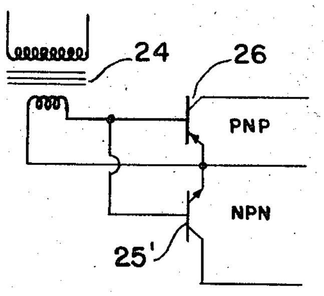
Figure 3:
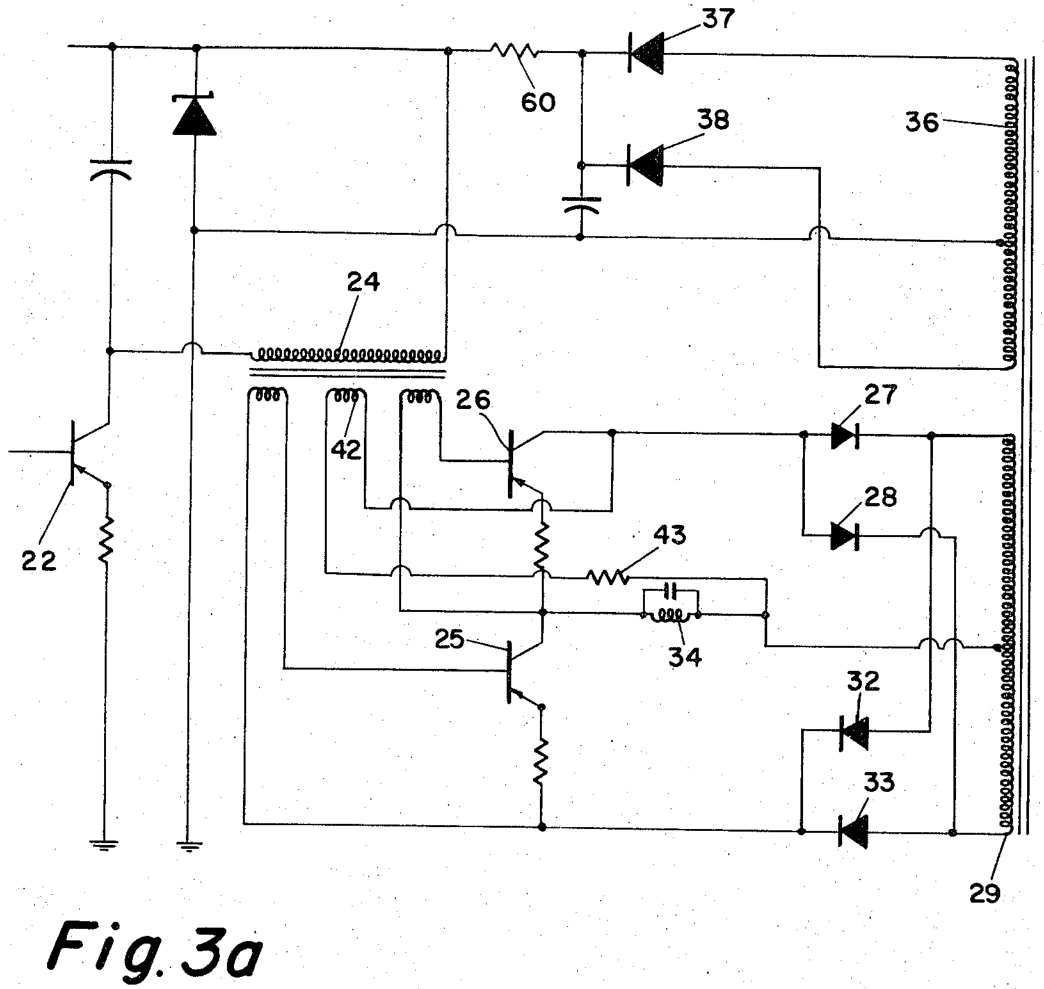
Figure 3A:
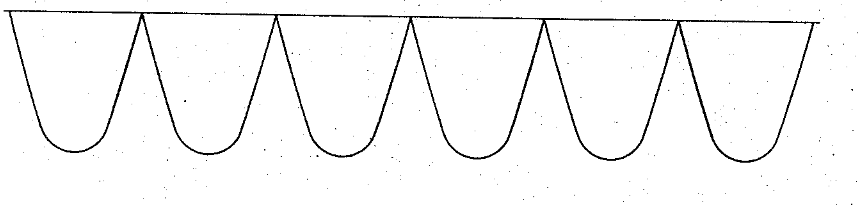

The foregoing and other objects, features and advantages of the invention will be better understood from the following more detailed description and appended claims in conjunction with the drawings in which:

FIG. 1 shows a circuit which is provided in accordance with this invention;

FIGS. 2*a*–2*h* show waveforms depicting the operation of the circuit;

FIG. 3 shows a modification of the circuit of this invention;

FIG. 3*a* shows the waveform at the center tap of secondary winding 29 of FIG. 3; and FIG. 3*b* is a fragmentary view of FIG. 1 showing modifications.

Referring now to FIG. 1, there is shown the amplifier of this invention used in a measuring system of the type in which a recorder pen is driven to record the output of a sensing element which is shown as the thermocouple 1.

It will, of course, be understood that the invention may be used in conjunction with other systems than the one shown.

The thermocouple 1 is connected through a range-changing circuit including a plurality of resistors, the range-changing circuit being indicated generally at 2. This circuit 2 may be changed to provide for different ranges for the temperatures sensed by the thermocouple 1. One of the thermocouple leads is connected through range-changing circuitry 2 to the measuring slidewire 3. This slidewire 3 forms part of a self-balancing potentiometric network. A motor 4 is driven in accordance with changes in the output fo the thermocouple to move the movable contact 5 of the measuring slidewire 3 to a position which produces a voltage across the potentiometer equal to that of the thermocouple thereby reducing the error voltage to zero. In order to sense the error voltage, a chopper is provided when may be of the photoelectric type, as shown. The circuitry of this chopper forms no part of the present invention. The chopper includes transformer 7, photoresistors 8 and 9, and lamps 10 and 11. The lamps 10 and 11 are alternately energized by a source of alternating current applied thereto. The motor 4 also drives a recorder pen 6 which records the variations in the output of the thermocouple 1.

One lead of the thermocouple 1 is connected through a damping resistor 12 and a filter, including resistors 13 and 14 and capacitors 15, 16 and 17, to the junction of the photoresistors 8 and 9. The resistances of these photoresistors alternately decrease and increase in accordance with the alternate energization of lamps 10 and 11. The result is that the D.C. potential difference between the voltage on movable contact 5 of slidewire 3 and the voltage developed by thermocouple 1 is applied between the center tap of the primary of transformer 7 and the junction of photoresistors 8 and 9. That difference, the error voltage, is converted to an A.C. signal which appears at the secondary of transformer 7. This A.C. signal has an amplitude proportional to the error voltage across the thermocouple and potentiometer and a phase determined by the polarity of the error voltage.

The A.C. signal developed across the secondary of transformer 7 is used to drive the motor 4 to reposition the movable contact 5 of slidewire 3 so that the voltage across the potentiometer is rebalanced. The A.C. signal on the secondary of transformer 7 is amplified in several stages of amplification. The stages of amplification which are not shown in detail are denoted in block form at 20. The amplification stages which include transistors 21 and 22 are shown in more detail.

The amplification stage including transistor 22 is provided with a base biasing resistor 23 of the thermal sensitive type. As the ambient temperature increases, the resistance of resistor 23 goes down thereby decreasing the gain of transistor 22. Consequently, the A.C. bias on subsequent transistor stages, which is developed by transistor 22, is decreased to compensate for the increased gain of transistors in the subsequent stage as caused by the increased temperature.

The A.C. input signal developed on the collector of transistor 22 is applied to an A.C. coupling circuit including transformer 24. Transformer 24 has two secondary windings which apply the input signal between the emitter and base of each of the transistors 25 and 26. Transistors 25 and 26 are connected in a single-ended push-pull configuration. That is, the emitter of transistor 26 is connected to the collector of transistor 25. The collector of transistor 26 is connected through a full wave rectifier, including diodes 27 and 28, to both ends of a secondary winding 29 of transformer 30. The primary 31 of transformer 30 is connected across a source of alternating current which may, for example, be a 60 cycles per second, 120 volt supply. It will be understood, of course, that the primary source of supply may be of any frequency suitable for operation of the circuit. In all cases, the A.C. bias voltage will be twice the repetition rate of the primary source.

To complete the amplifier connections, the emitter of transistor 25 is connected through a full wave rectifier including diodes 32 and 33 to both ends of the secondary winding 29. The secondary winding 29 is center-tapped and this center tap is connected to one end of the load device which, in this case, is the control winding 34 of the motor 4. The other end of control winding 34 is connected to the common junction of the emitter of transistor 26 and the collector of transistor 25. The reference winding **34*a* of motor 4 is connected to the primary source of alternating current. When the current through control winding 34 is of the same repetition rate as the primary source, the motor 4** will be driven.

The operation of the circuitry described thus far is as follows. When the voltage on the movable contact of the slidewire 3 is balanced with the voltage output of thermocouple 1, the chopper does not produce an A.C. signal across the secondary of transformer 7. Therefore, the only signal applied to transistors 25 and 26 is the A.C. bias signal to be subsequently described. This A.C. bias signal causes conduction of transistors 25 and 26 which causes current to flow through the single-ended output of the amplifier and through winding 34 at a 120 cycles per second rate. There is no net current flow of the proper repetition rate and the motor 4 is not driven. However, when the voltage output of thermocouple 1 changes, the voltage across the potentiometric circuit will be unbalanced and the chopper produces an A.C. input signal. This A.C. signal appearing at the secondary of transformer 7 has an amplitude proportional to the unbalance of the voltage across the potentiometric circuit and a phase which is determined by the polarity of the unbalanced voltage. This A.C. signal is applied through the transistor amplifier stages and through transformer 24 to the bases of transistors 25 and 26. This A.C. signal will cause one of the transistors 25 or 26 to conduct more heavily than the other during alternate half cycles. The result is that there is a net current flow of the proper repetition rate through the winding 34 which causes the motor 4 to drive the movable contact 5 of the slidewire to a position which rebalances the system.

In accordance with this invention, there is provided means for developing an A.C. bias signal at twice the frequency of the alternating current source applied across transistors 25 and 26. In order to develop this double frequency signal, a resistor 41 is added in series with the filter capacitor 39 for the full wave power supply. This power supply includes diodes 37 and 38 to which the A.C. voltage from secondary winding 36 is applied. Assuming that the alternating current source applied to the primary winding 31 is a 60 cycles per second voltage, then the signal appearing at the common junction of diodes 37 and 38 will have a 120 cycles per second repetition rate. This 120 cycles per second repetition rate signal is applied through capacitor 39 to the junction of resistors 40 and 41 which are in the emitter circuit of transister 21. There are several places at which the 120 cycles per second signal could be injected into the amplifying stages. The application of this 120 cycles per second signal to the emitter circuit of transistor 21 is given by way of an example. The 120 cycles per second signal is amplified in transistors 21 and 22 and applied to the primary of the coupling transformer 24. The secondary windings of transformer 24 apply the signal to the bases of transistors 25 and 26. The phase of the 120 cycles per second signal, with respect to the 60 cycles per second primary source, is constant because the 120 cycles per second signal is derived from the 60 cycles per second source. Furthermore, the phase of the 120 cycles per second signal is such that it will aid in driving the transistor to conduction during each half cycle that conduction through the transistor is possible. It should be noted that the phase of the 120 cycles per second signal may be shifted somewhat with respect to the 60 cycles per second source by the transistor stages 21 and 22. However, this will not adversely affect the operation of the circuit.

Figure 2A:
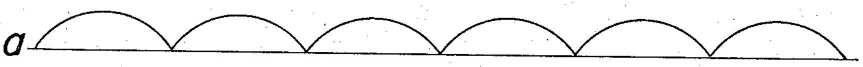
Figure 2B:
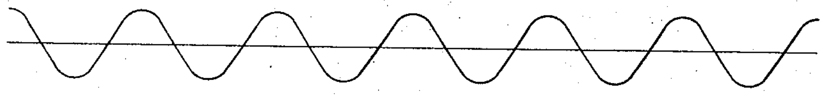
Figure 2C:
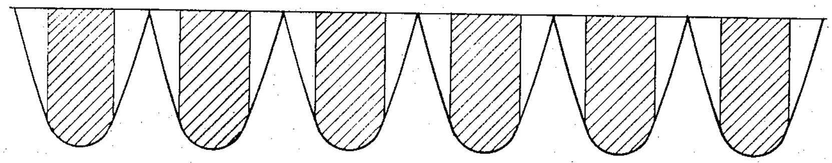
Figure 2D:
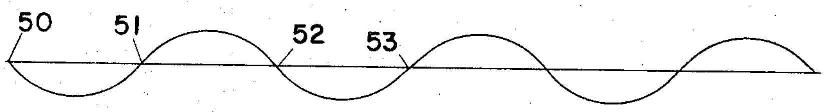
Figure 2E:
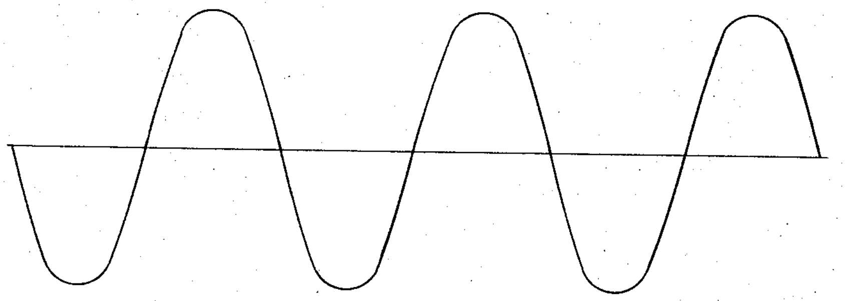

The operation of the invention can be best understood with reference to the waveforms of FIGS. 2*a*–2*h*. FIG. 2*e* shows the 60 cycles per second alternating current source which is applied to the primary 31 of transformer 30. This 60 cycles per second voltage is applied through the full wave rectifier, including diodes 37 and 38, to produce the waveform shown in FIG. 2*a*. The waveform of FIG. 2*a* is amplified in transistors 21 and 22 and applied to coupling transformer 24. The voltage induced in the secondaries of transformer 24 has the waveform shown in FIG. 2*b*. This is a 120 cycles per second wave which appears, for example, at the base of transistor 26. The voltage at the collector of transistor 26 will assume the waveform shown in FIG. 2*c* because of the full wave rectification of the 60 cycles per second source provided by diodes 27 and 28.

When there is no input signal, the 120 cycles per second bias voltage produces collector current in transistor 26 during the time periods indicated by the shaded portion of FIG. 2*c*. This collector current is at a 120 cycles per second rate and the motor control winding 34 will not respond to this signal. When an input signal, indicating that the potentiometric circuit is unbalanced, is produced, FIG. 2*d*, the conduction of transistor 26 will change. The input signal of FIG. 2*d* has the effect of increasing the conductivity of transistor 26 during the first half cycle indicated between 50 and 51 on FIG. 2*d*. The input signal has the effect of decreasing the conductivity of the transistor 26 during the second half cycle from 51 to 52 on FIG. 2*d*. The net effect is to produce a 60 cycles per second flow of current through the control winding 34. This current flow drives the motor 4 in a direction which will rebalance the system.

Figure 2F:
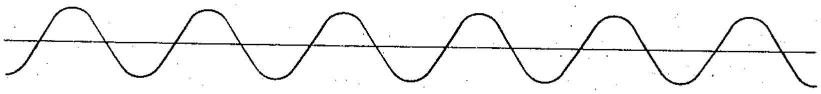
Figure 2G:
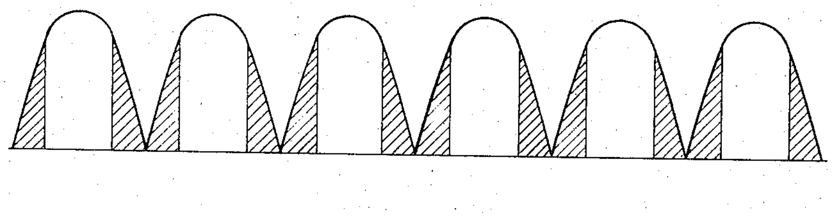
Figure 2H:
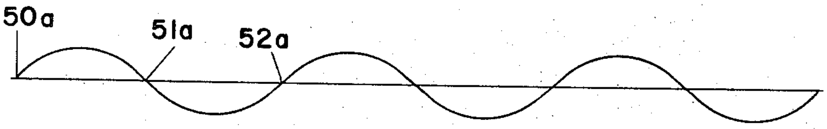

The A.C. bias voltage applied to the base of transistor 25 is shown in FIG. 2*f*. The input signal applied to the base of transistor 25 is shown in FIG. 2*h*, and the emitter voltage applied to transistor 25 is shown in FIG. 2*g*. It should be noted that the A.C. bias signal and the input signal of FIGS. 2*f* and 2*h* are reversed in phase with respect to the signals applied to the base of transistor 26. This, of course, is determined by the polarity of the secondary windings of transformer 24.

The 120 cycles per second bias voltage induces emitter current flow in transistor 25 during the time periods indicated by the shaded portions of FIG. 2*g*. When the input signal, shown in FIG. 2*h*, is applied to the base of transistor 25, the current flow during the half cycle from 50*a* to 51*a* is decreased and the current flow during the second half cycle from 51*a* to 52*a* is increased.

When an input signal of the phase shown in FIGS. 2*d* and 2*h* is applied to the bases of transistors 26 and 25 respectively, there is produced increased current flow through transistor 26 during the first half cycle, and subsequent alternate half cycles, and increased current flow through transistor 25 during the second half cycle, and subsequent alternate half cycles. Therefore, the transistors act in a push-pull manner to produce a 60 cycles per second current flow through control winding 34. The motor 4 responds to this 60 cycles per second signal to rebalance the potentiometric circuit.

If the unbalance voltage across the potentiometric circuit is of the opposite polarity, the input signal produced by the chopper at the secondary of transformer 7 is of the opposite phase. That is, the base signals shown in FIGS. 2*d* and 2*h* would be of the opposite phase. In this case, transistor 25 would conduct more heavily during the first and subsequent alternate half cycles while transistor 26 would conduct more heavily during the second and subsequent alternate half cycles. This would drive the motor in the opposite direction to rebalance the system.

In FIG. 3, there is shown an alternate circuit for developing and applying the A.C. bias voltage to the bases of the transistors. In FIG. 3, transistor 22, coupling transformer 24 and transistors 25 and 26 are the same components as those shown and described in FIG. 1 and bear like reference numerals. The A.C. bias signal is developed from the center-tapped secondary 29 which is connected to a full wave rectifier including diodes 27 and 28. The bias signal on the center tap is applied through resistor 43 to winding 42 on transformer 24. This has the effect of applying the 120 cycles per second A.C. bias voltage directly to coupling transformer 24.

The operation of the modification shown in FIG. 3 is quite similar to the operation previously described. The voltage developed at the center tap of secondary winding 29 assumes the waveform shown in FIG. 3*a*. This voltage is applied through resistor 43 to the winding 42 of transformer 24. This induces the voltages shown by the waveforms of FIGS. 2*b* and 2*f* in the secondaries of transformer 24. These secondaries are connected to the bases of transistors 26 and 25. The operation of the circuit of FIG. 3 is in all other ways similar to the operation described in conjunction with the waveforms of FIGS. 2*b* through 2*h*.

While particular embodiments of the invention have been shown and described, it will, of course, be understood that various changes may be made without departing from the principles of the invention. For example, the push-pull transistors 25 and 26 need not be both of the PNP type, it being understood by those skilled in the art that they may both be NPN's or one a PNP and the other an NPN. If both are NPN's, diodes 27, 28, 32 and 33 will be poled in the opposite direction to those shown in FIGS. 1 and 3. If transistor 26 is PNP type and transistor 25' is NPN type, diodes 27, 28, 32 and 33 will be poled in the direction as shown in FIGS. 1 and 3, and the emitter of transistor 25' will be connected to the emitter of transistor 26 making it possible to use one secondary winding on transformer 24 as shown in FIG. 3*b*. The appended claims are, therefore, intended to cover any such modifications within the true spirit and scope of the invention.

What is claimed is:

1. An amplifier comprising:

first and second transistors, the emitter of the first transistor being connected to the collector of the second transistor and to one end of a load device, a power transformer having a primary winding connected to a source of alternating current and having first and second center-tapped secondary windings, said first secondary winding being connected between the collector of said first transistor and the emitter of said second transistor and having the center tap connected to the other end of said load device, an A.C. coupling circuit including a coupling transformer having first and second primary windings and first and second secondary windings, the input signal being applied to said first primary winding, said first and second secondary windings of said coupling transformer being connected to the bases of said first and second transistors and coupling to said bases an input signal having a phase which induces conduction in said first transistor on alternate half cycles of said alternating current and which induces conduction in said second transistor on different alternate half cycles of said alternating current, means for producing an A.C. bias signal in synchronism with said alternating current source and of twice the repetition rate of said alternating current source, means, including said secondary winding of said power transformer, for applying said bias signal to said second primary winding of said coupling transformer so that said bias signal is applied to the bases of said transistors to produce conduction in said transistors during portions of each half cycle of said alternating current source, and a full wave rectifier connected across said secondary winding of said power transformer, the output of said full wave rectifier being applied to said A.C. coupling circuit.

2. An A.C. amplifier having improved small signal response comprising:

first and second transistors of like conductivity type, the emitter of the first transistor being connected to the collector of said second transistor, a load device, one end of said load device being connected to the common connection of the emitter of said first transistor and the collector of said second transistor, a power transformer having a primary winding connected to a source of alternating current and having first and second secondary windings, said first secondary winding having a center tap connected to the other end of said load device, first and second full wave rectifiers, each being connected across said first secondary winding and each being poled for current flow in opposite directions, said first full wave rectifier being connected to the collector of said first transistor, said second full wave rectifier being connected to the emitter of said second transistor, a third full wave rectifier connected across said second secondary winding, a coupling transformer having a primary winding and first and secondary windings, said first secondary winding being connected between the base and emitter of said first transistor, said second secondary winding being connected between the base and emitter of said second transistor, the input signal for said amplifier being applied to the primary winding of said coupling transformer, and means for applying the output of said third full wave rectifier to the primary winding of said coupling transformer so that there is developed on the bases of said first and said second transistors a bias signal having a repetition rate twice that of said alternating current source.

3. In combination with a measuring system of the type including a sensing device connected to a self-balancing network having motive means for moving said self-balancing network so that the output voltage equals the output voltage of said sensing device, and means for sensing deviations across said output voltages caused by fluctuations in the output of said sensing means, an amplifier for driving said motive means to rebalance said self-balancing network in accordance with said deviations in the output of said sensing means, said amplifier comprising:

first and second transistors connected in a single-ended push-pull configuration, said motive means being connected between the single-ended output of said amplifier and a source of alternating current, said alternating current source being connected to said first and said second transistors so that said transistors conduct current through said motive means, means for producing an A.C. bias signal in synchronism with said source of alternating current and of twice the repetition rate of said alternating current source, said last-named means including:

a power transformer having said alternating current source applied to the primary thereof and a secondary winding, and a full wave rectifier connected across said secondary winding, the output of said full wave rectifier being applied to said A.C. coupling circuit, and an A.C. coupling circuit connected to the bases of said first and said second transistors, the output of said sensing means being applied to said A.C. coupling circuit, and said A.C. biasing signal being applied to said A.C. coupling circuit to produce conduction in said transistors so that said amplifier responds more quickly to said output of said sensing means whereby the deadband of the measuring system is decreased, said A.C. coupling circuit including:

a coupling transformer having a primary and first and second secondary windings, said first secondary winding being connected between the emitter and base of said first transistor, said second secondary winding being connected between the emitter and a base of said second transistor, said A.C. bias signal being applied to the primary winding of said coupling transformer.

4. The combination recited in claim 3 wherein said sensing means includes an A.C. chopper for converting a D.C. voltage to an A.C. input signal and at least one transistorized stage of amplification, the output voltage of said self-balancing network being applied to said chopper, the output of said chopper being applied to said transistorized stages of amplification, the output of said transistorized stages of amplification being connected to the primary winding of said coupling transformer.

5. The combination recited in claim 4 wherein said A.C. bias signal is applied as an input to one of said transistorized stages of amplification.

References Cited

UNITED STATES PATENTS

| | | | |
|---|---|---|---|
| 2,651,014 | 9/1953 | Chapman | 318—283 |
| 2,945,996 | 7/1960 | Norton et al. | 318—28 |
| 3,023,368 | 2/1962 | Erath | 330—17 |
| 3,067,337 | 12/1962 | Bowman | 318—28 X |
| 3,102,983 | 9/1963 | Turner | 328—150 |
| 3,168,691 | 2/1965 | Olofsson | 318—207 |
| 3,201,672 | 8/1965 | Louis | 318—207 |
| 3,308,307 | 3/1967 | Moritz | 318—28 X |

BENJAMIN DOBECK, *Primary Examiner.*